(12) United States Patent
Urbano et al.

(10) Patent No.: US 7,479,518 B2
(45) Date of Patent: Jan. 20, 2009

(54) ALKYD RESIN EMULSIONS FOR COATING VARNISHES

(75) Inventors: Edmund Urbano, Graz (AT); Michael Gobec, Graz (AT); Oliver Ferk, Graz (AT)

(73) Assignee: Cytec Surface Specialties Austria GmbH (AT)

( * ) Notice: Subject to any disclaimer, the term of this patent is extended or adjusted under 35 U.S.C. 154(b) by 403 days.

(21) Appl. No.: 10/553,635

(22) PCT Filed: Apr. 19, 2004

(86) PCT No.: PCT/EP2004/004115

§ 371 (c)(1),
(2), (4) Date: Oct. 19, 2005

(87) PCT Pub. No.: WO2004/094546

PCT Pub. Date: Nov. 4, 2004

(65) Prior Publication Data

US 2007/0167603 A1    Jul. 19, 2007

(30) Foreign Application Priority Data

Apr. 21, 2003 (EP) .................................. 03009114

(51) Int. Cl.
*C08G 18/42* (2006.01)
*C08G 63/02* (2006.01)
(52) U.S. Cl. ...................................... 524/500; 528/272
(58) Field of Classification Search .................. 524/500; 528/272
See application file for complete search history.

(56) References Cited

U.S. PATENT DOCUMENTS

| | | | |
|---|---|---|---|
| 3,269,967 A | 8/1966 | Broadhead | |
| 3,440,193 A | 4/1969 | Campagna | |
| 3,457,206 A | 7/1969 | Tonner | |
| 5,466,772 A | 11/1995 | Angelmayer et al. | |
| 6,265,461 B1 * | 7/2001 | Urbano et al. | 522/111 |
| 6,469,096 B1 | 10/2002 | Urbano et al. | |

FOREIGN PATENT DOCUMENTS

| | | |
|---|---|---|
| AT | 325 742 | 11/1975 |
| AT | 333 035 | 10/1976 |
| AT | 336 277 | 4/1977 |
| DE | 43 06 946 | 9/1994 |
| EP | 1 092 742 | 4/2001 |
| WO | WO-94/18260 | 8/1994 |

* cited by examiner

*Primary Examiner*—Mark Eashoo
*Assistant Examiner*—Noah Frank
(74) *Attorney, Agent, or Firm*—Connolly Bove Lodge & Hutz LLP

(57) ABSTRACT

Disclosed are alkyd resin emulsions for coating varnishes, containing a water-insoluble alkyd resin A and a water-soluble alkyd resin B that is used as an emulsifying resin and represents an esterification product of an alkyd resin Ba which can be homogeneously mixed with the alkyd resin A at a weight ratio (Ba to A) ranging between 2:98 and 50:50, alkyd resin A being the resin that is to be emulsified, and an adduct Bb of a $C_1$-$C_4$ alkoxy polyethylene glycol Bba and a cycloaliphatic dicarboxylic acid anhydride Bbb at a mole ration (Bba to Bbb) ranging between 09.95:1.05 mol/mol and 1.05:0.95 mol/mol. Also disclosed is a method for the production thereof, the use thereof for coating substrates selected among textiles, mineral materials, metals, and wood.

8 Claims, No Drawings

ALKYD RESIN EMULSIONS FOR COATING VARNISHES

RELATED APPLICATIONS

This application is a national stage application (under 35 U.S.C. 371) of PCT/EP2004/004115 filed Apr. 19, 2004 which claims benefit to European application 03009114.4 filed Apr. 21, 2003.

FIELD OF THE INVENTION

The invention relates to alkyd resin emulsions for topcoats, in particular those having an increased solids content, and to a process for their preparation in a form which is optionally also free from solvent and/or neutralising agent.

BACKGROUND OF THE INVENTION

Water-dilutable binders for paints and other coating compositions in various forms have been developed in recent years substantially for ecological reasons. Aqueous dispersions of alkyd resins, in the following consistently called "alkyd resin emulsions" used for higher-quality paints, such as topcoats on wood and metal, have, for reasons due to their preparation, their stabilisation or their further processing, a mass fraction of solids of not more than 45% and contents of organic solvents and/or of volatile neutralising agents, such as amines and ammonia.

These contents can indeed be decreased, as described in U.S. Pat. No. 3,269,967 or U.S. Pat. No. 3,440,193, if emulsifiers such as alkylphenol ethoxylates and fatty alcohol ethoxylates are used, but the properties of the films formed, such as drying, hardness, gloss and resistance to water and weather, are adversely influenced by these low molar mass substances, which are present in unchanged form in the cured film. These binders therefore cannot be used for topcoats.

In the Austrian Patent Specifications AT-B 325 742, 333 035 and 336 277, the use of emulsifier resins is described which are modified with polyethylene glycol for emulsification of alkyd resins, as a result of which the disadvantages mentioned are said to be largely avoided. However, to achieve stable emulsions, in addition to a higher content of emulsifier resin, these binders also require neutralising agents for stabilisation and also organic auxiliary solvents. Films obtained with such binder emulsions consequently also show deficiencies in drying and resistance to water and weather.

It has also not been possible to eliminate these disadvantages by the use of unsaturated polyurethanes as emulsifiers, such as are described in the document DE-A 43 06 946.

According to the teaching of U.S. Pat. No. 3,457,206, the use of alkoxypolyethylene glycol (polyethylene glycol monoalkyl ether) for emulsification also leads to aqueous alkyd resins only in combination with neutralisation of free carboxyl groups with alkanolamines or alkali metal hydroxides, but these alkyd resins are not suitable for high-solids paints.

According to the teaching of WO-A 94/18260, water-soluble resins which are used as dispersing agents or wood preservatives are obtained by using alkoxypolyethylene glycol also without neutralisation of acidic groups. These resins contain methoxypolyethylene glycol bonded in a readily hydrolysable form and can be diluted with water only shortly before use. They are not suitable as a sole binder for weather-resistant, glossy coatings such as are expected of alkyd resin topcoats.

In EP-A 1 092 742, it has been described that high-solids, aqueous emulsions of alkyd resins are obtained without additional neutralisation and solvent if the preparation of the emulsions is carried out by using emulsifier resins which have a particular constitution and are based on a polyhydroxy component from the class of sugar alcohols which are capable of ring closure by dehydration, an alkoxypolyethylene glycol and mono- and dicarboxylic acids or anhydrides thereof. Due to the specific constitution of the emulsifier resin and the exclusive use of cycloaliphatic dicarboxylic acids, a sufficiently high resistance of the aqueous solution to hydrolysis and compatibility with the alkyd resins to be emulsified are achieved, which allow solvent-free alkyd resins to be emulsified in the form of their melt. However, alkyd resin emulsions prepared by this process can be only used to a limited degree for high-gloss and low-yellowing pigmented topcoats because the emulsifying resin used adversely influences gloss retention and yellowing of the paint under weathering conditions.

SUMMARY OF THE INVENTION

It has now been found, surprisingly, that high-solids, aqueous emulsions of alkyd resins are obtained without additional neutralisation and without addition of solvents if the preparation of the emulsions is carried out by using novel emulsifying resins which have a particular constitution, and under certain process conditions.

The present invention accordingly relates to alkyd resin emulsions for topcoats comprising a water-insoluble alkyd resin A and a water-soluble alkyd resin B, which is used as an emulsifying resin and which is an esterification product of an alkyd resin Ba, which is homogeneously miscible with the alkyd resin A to be emulsified at least in a mass ratio range of Ba to A of from 2:98 to 50:50, and an adduct Bb of a $C_1$-$C_4$-alkoxypolyethylene glycol Bba and a cycloaliphatic dicarboxylic acid anhydride Bbb in an amount-of-substance ratio of Bba to Bbb of from 0.95:1.05 mol/mol to 1.05:0.95 mol/mol.

The present invention also relates to a process in which
in the first step mass fractions of
- 70% to 95% of a $C_1$-$C_4$-alkoxypolyethylene glycol Bba having a weight-average molar mass $M_w$ of from 500 g/mol to 4,000 g/mol, and
- 5% to 30% of a cycloaliphatic dicarboxylic acid anhydride Bbb are mixed in a substance amounts ratio of from 0.95:1.05 mol/mol to 1.05:0.95 mol/mol, and are reacted in the presence of a catalyst, with opening of the acid anhydride, to form an adduct Bb, in the second step a mass fraction of from 40% to 75% of the adduct Bb is esterified with a mass fraction of from 25% to 60% of the alkyd resin Ba, the sum of the said mass fractions in the reaction mixture giving 100%, to form an alkyd resin B, in the third step the alkyd resin B is mixed with water, a mass fraction of the alkyd resin of from 30% to 60% being present in the mixture, and the mixture having a dynamic viscosity, measured at 23° C. and a shear gradient of 100 s$^{-1}$, of from 5 Pa·s to 50 Pa·s, and in the fourth step the alkyd resin A is mixed with the mixture of water and the alkyd resin B from the third step at a temperature of below 100° C. and the resulting alkyd resin emulsion is diluted to a solids mass fraction of from 40% to 75% and a dynamic viscosity of from 200 mPa·s to 3,000 mPa·s by addition of water.

Finally, the present invention also relates to the use of the alkyd resin emulsions according to the invention for the preparation of water-dilutable paints or glazes, in particular as binders for the coating of substrates chosen from textiles, mineral materials, metals and wood.

In this context, "homogeneously miscible" or "compatible" is understood as meaning a system of at least two components which is a single phase in the entire composition range under consideration. In this context, "water-soluble" is understood as meaning a substance which forms with water a single-phase liquid mixture which contains at least a mass fraction of 5% of the dissolved substance. Substances to which this condition does not apply are called "water-insoluble".

DETAILED DESCRIPTION OF THE PREFERRED EMBODIMENTS

Suitable alkyd resins A are polyester resins which are modified with natural fats, oils and/or synthetic fatty acids and are prepared by esterification of polyhydric alcohols, one of which must be at least trihydric, with polybasic carboxylic acids and the said fats, oils and/or fatty acids.

Preferred alkyd resins A include short-, medium- or long-oil alkyd resins having an oil content (mass fraction of oils in the mixture of the starting substances) of from 25% to 75%, which can optionally be modified in a known manner, e.g. by monocarboxylic acids, such as benzoic acid or tert.-butylbenzoic acid, resin acids, such as are present, for example, in colophony, or branched carboxylic acids, such as e.g. 2-ethylhexanoic acid, isononanoic acid and versatic acid, or hard resins, such as colophony resins or phenolic resins, or by the incorporation of urethane groups. Mixtures of these resins can of course also be employed as long as they are homogeneously miscible in the envisaged range of the composition.

For oxidatively drying alkyd resins, unsaturated fatty acids or oils having an iodine number of at least 100 cg/g, preferably of from 120 cg/g to 200 cg/g, are preferred, where isolated and conjugated double bonds may be present. They are obtained, for example, from plant sources, such as soy oil, fish oil, sunflower oil, linseed oil, safflower oil and cottonseed oil, or originate from tall oil distillation. Fatty acids having conjugated double bonds are obtained by catalytic isomerisation of natural fatty acids or from dehydrated castor oil. Conjugated oil is preferably obtained by dehydration of castor oil.

The iodine number is defined according to DIN 53 241-1 as the quotient of that mass $m_I$ of iodine which is added on to the olefinic double bonds, with decolourisation, of a sample to be analysed and the mass $m_B$ of this sample (mass of the solid in the sample in the case of solutions or dispersions); its conventional unit is "g/(100 g)" or "cg/g".

In addition, saturated oils or saturated fatty acids having 10 to 22 carbon atoms can be used in part or completely, as long as an oxidative drying of the resin obtained is not impaired.

The constitution and the preparation of these resins are known to the person skilled in the art and are described in the relevant technical literature. The resins are advantageously employed in undiluted form (in their 100% form).

The alkyd resins Ba are preferably identical to the alkyd resins A or likewise preferably comprise the same substances as starting substances, the composition differing only quantitatively and not qualitatively (that is to say only the amount, and not the nature, of the composition). According to the invention, it is necessary for them to be homogeneously miscible with the alkyd resins A, at least in the range of compositions of mass fractions of from 2% to 50% of the resin Ba in the mixture with the alkyd resin A. Preferably, the alkyd resin Ba has a hydroxyl number of at least 30 mg/g.

The hydroxyl number is defined according to DIN EN ISO 4629 as the quotient of that mass $m_{KOH}$ of potassium hydroxide which has exactly as many hydroxyl groups as a sample to be analysed and the mass $m_B$ of this sample (mass of the solid in the sample in the case of solutions or dispersion); its conventional unit is "mg/g".

The $C_1$-$C_4$-alkoxypolyethylene glycol Bba is a polyethylene glycol which is etherified on one side and has a weight-average molar mass of from approx. 500 g/mol to approx. 4,000 g/mol, preferably of from 750 g/mol to 3,800 g/mol, and in particular of from 900 g/mol to 2,500 g/mol. The etherifying alcohol is chosen from the linear and branched aliphatic alcohols having one to four carbon atoms, that is to say methanol, ethanol, n- and isopropanol and n-, sec-, iso- and tert.-butanol. The polyethylene glycols monoetherified with methanol are preferred.

The cycloaliphatic dicarboxylic acid anhydrides Bbb are, in particular, hexahydrophthalic anhydride, tetrahydrophthalic anhydride and their alkyl derivatives, such as e.g. methyltetrahydrophthalic anhydride. Surprisingly succinic and maleic anhydride have not proved suitable; like phthalic anhydride, they result in a higher hydrolysis rate and a poorer stability of the alkyd resin emulsions.

The components Bba and Bbb are employed in an amount-of-substance ratio of Bba to Bbb of from 0.95:1.05 mol/mol to 1.05:0.95 mol/mol, and this ratio is preferably 0.97:1.03 to 1.03:0.97, and in particular 0.99:1.01 to 1.01:0.99.

In the process according to the invention, in the first step mass fractions of from 70% to 95%, preferably 75% to 94%, and in particular 80% to 93% of the alkoxypolyethylene glycol Bba are mixed with 5% to 30%, preferably 6% to 25%, and in particular 7% to 20% of the dicarboxylic acid anhydride Bbb in an amount-of-substance ratio of from 0.95:1.05 mol/mol to 1.05:0.95 mol/mol, and are reacted in the presence of a catalyst, opening the acid anhydride, to give an adduct Bb. Depending on the molar masss of components Bba and Bbb, an amount-of-substance ratio which is preferably 0.97:1.03 to 1.03:0:97, and in particular 0.99:1.01 to 1.01:0.99 is established. In this procedure, a mixture of the said components is first prepared and this is then preferably heated, with the addition of a catalyst, in particular a tertiary amine, to a temperature of from 100° C. to 180° C., preferably 120° C. to 170° C. and in particular 130° C. to 160° C. The reaction is carried out until no further change in the acid number of the reaction mixture is found in samples taken at regular intervals.

The acid number is defined according to DIN EN ISO 3682 as the quotient of that mass $m_{KOH}$ of potassium hydroxide which is required to neutralise a sample to be analysed and the mass $m_B$ of this sample (mass of the solid in the sample in the case of solutions or dispersions); its conventional unit is "mg/g".

In the second step, a mass fraction of from 40% to 75%, preferably 42% to 70%, in particular 45% to 65% of the adduct Bb is esterified with a mass fraction of from 25% to 60%, preferably 30% to 58%, in particular 35% to 55% of the alkyd resin Ba, the sum of the said mass fractions in the reaction mixture giving 100%, to form an alkyd resin B. This reaction is preferably carried out subsequently to the formation of the adduct Bb in the same reaction vessel. Esterification is preferably carried out at a temperature of from approx. 180° C. to approx. 260° C., preferably approx. 200 to approx. 240° C., and preferably in the presence of an entraining agent, such as xylene, with azeotropic distillation and recycling of the entraining agent. Esterification is continued until a sample then taken has an acid number of not more than 3 mg/g.

After cooling of the reaction mixture, in the third step the alkyd resin B obtained is mixed with water, a mass fraction of the alkyd resin of 30% to 60% being present in the mixture and the mixture having a dynamic viscosity, measured at 23° C. and a shear gradient of 100 s$^{-1}$, of from 5 Pa·s to 50 Pa·s.

In the second step, the alkyd resin B can optionally be modified with monocarboxylic acids, such as benzoic acid or tert.-butylbenzoic acid, resin acids, such as are present in colophony, or branched carboxylic acids, such as e.g. 2-ethylhexanoic acid, isononanoic acid or versatic acid.

In the fourth step, the alkyd resin A is stirred into the mixture of water and the alkyd resin B from the third step at a temperature of below 100° C., and the resulting alkyd resin emulsion is diluted to a mass fraction of solids of from 40% to 75% and a dynamic viscosity of from 200 mPa·s to 3,000 mPa·s by addition of water.

Components A and B are mixed in a ratio of from 70% to 95%, preferably 75% to 93%, and in particular 80% to 91% of component A and 5% to 30%, preferably 7 to 25%, and in particular 9% to 20% of component B, in each case based on the mass of the solid, at a temperature of up to approx. 100° C. After thorough homogenisation, the emulsion obtained in this way can be diluted to the desired solids content, showing a uniform decrease in viscosity upon addition of a further amount of water.

In the process according to the invention, molten solid resins having a temperature of up to 120° C. can also be added as component A to the cold, aqueous solution of the emulsifier resin B, so that a mixing temperature of not more than 100° C. is achieved. Addition of the aqueous emulsifier resin solution to molten solid resin A is also possible, as long as a mixing temperature of 100° C. is not exceeded thereby.

During mixing of component A and the aqueous solution of B, an oil-in-water emulsion forms immediately, as a result of which the emulsion obtained can already be diluted to the desired solids content after brief homogenisation. The viscosity maxima or gel states which occur in conventional processes—in which, before the addition of water, an emulsifier or emulsifier resin are mixed with the resin to be emulsified—and can impede or at least make difficult a homogenisation thus also do not occur. Known emulsifier resins and the emulsifiers built up in a simple manner, such as fatty alcohol ethoxylates and ethoxylated sorbitan esters, also already tend towards gel formation at a low solids content during the preparation of the aqueous emulsifying solution required, as a result of which a mixing of the emulsifier solution with the water-insoluble alkyd resin A and emulsification thereof as in the process according to the invention are unsuccessful.

With the aid of the water-soluble alkyd resins B according to the invention and the process described, various water-insoluble alkyd resins A which serve as binders for coating materials can be converted into stable aqueous emulsions that are suitable for further processing and use.

According to the invention, it is furthermore preferable to reduce the acid number of the alkyd resins A and/or Ba. to not more than 5 mg/g, preferably to up to 3 mg/g, by reaction with a monoepoxide, such as versatic acid glycidyl ester, before further processing thereof.

The water-soluble alkyd resin used as component B serves as an emulsifying resin in the form of its aqueous solution having a mass fraction op solids of from 30% to 60% and a dynamic viscosity of from 5 to 50 Pa·s. The pH of this solution of this alkyd resin is 3 to 5, but in the products according to the invention has only a slight influence on the stability of the emulsion achieved. These solutions of the alkyd resin B are distinguished by a constant viscosity and only a small increase in the acid number during storage of four weeks at 40° C.

In the esterification of the adduct Bb of the alkoxypolyethylene glycol Bba and the cycloaliphatic dicarboxylic acid anhydride Bbb with an alkyd resin Ba which is of the same type as the alkyd resin A to be emulsified or is compatible with it preferably in any ratio and has a hydroxyl number of preferably at least 30 mg/g, an emulsifying resin is formed, with the aid of which alkyd resin emulsions for high-gloss, pigmented topcoats are surprisingly achieved.

Depending on the nature of the emulsified alkyd resin, emulsions prepared according to the invention can be employed as binders for paints, which can also be pigmented with (in)organic pigments and fillers, and for coating compositions for textiles or mineral materials and the like. In the paint sector, clearcoats, glazes, primers and topcoats can be formulated on the basis of the emulsions according to the invention.

For coating workpieces of iron or steel, the emulsions are preferably employed with a pH of more than 7, in order to avoid the formation of flash rust which occurs during use of acidic aqueous paint systems. Adjustment of the pH with alkali metal or alkaline earth metal hydroxides can be carried out in any phase of the process and has no influence on the stability of the emulsion.

The following examples illustrate the invention.

In the following examples, as in the preceding text, all data with the unit "%" denote mass fractions (quotient of the mass of the substance in question and the mass of the mixture), unless stated otherwise. Concentration data in "%" are mass fractions of the dissolved substance in the solution (mass of the dissolved substance divided by the mass of the solution). The measurements of the viscosity were carried out in accordance with DIN ISO 3219 at 23° C. and a shear rate of 25 s$^{-1}$. Determination of the mass fraction of solids was carried out in accordance with DIN 55671 at a temperature of 120° C. and a residence time in the circulating air oven of 5 minutes.

EXAMPLES

The following products were employed in the examples:
Component A
Commercially available alkyd resins in solvent-free form were employed as component A. Their description and characteristic values are summarised in Table 1.

TABLE 1

Compositions of the alkyd resins (mass fractions in the reaction mixture, based on the mass of the resin, in cg/g)

| | Alkyd resin A and Ba | | |
|---|---|---|---|
| | A1 | A2 | A3 |
| Sunflower oil fatty acid | 40 | | |
| Tall oil fatty acid | | 47 | |
| Soya oil | | | 62 |
| Benzoic acid | 18 | | |
| p-tert.-Butylbenzoic acid | | 12 | |
| Phthalic anhydride | 25 | 24 | 24.5 |
| Pentaerythritol | 25 | 24 | 16 |
| Yield in g | 100 | 100 | 100 |
| Acid number in mg/g | <5 | <5 | <5 |
| OH number in mg/g | 70 | 80 | 80 |

Component B

The same alkyd resins as for A in solvent-free form were employed as alkyd resins Ba for component B. Their description and characteristic values are summarised in Table 1.

Example 1

Adducts Bb

The masses stated in Table 2 of methoxypolyethylene glycols (the type stated is the weight-average molar mass of the monoether in g/mol) and tetrahydrophthalic anhydride were heated to 150° C. in a conventional synthetic resin reactor with the addition of a mass fraction of 0.1% triethylamine as a catalyst. This temperature was maintained until a constant acid number according to Table 2 was reached.

TABLE 2

Mass fraction of the reactants in cg/g

|  | Adduct Bb | |
| --- | --- | --- |
|  | Bb1 | Bb2 |
| Methoxypolyethylene glycol 2000 | 92.9 |  |
| Methoxypolyethylene glycol 1000 |  | 86.8 |
| Tetrahydrophthalic anhydride | 7.1 | 13.2 |
| Acid number in mg/g | 26.5 | 49.0 |

Example 2

Emulsifier Resins B

The alkyd resins stated in Table 3 were heated to 220° C. with the adducts Bb1 and Bb2 from Example 1 in the same synthetic resin reactor, and 10% of the mass of the reaction mixture of xylene was added. After azeotropic distillation at 230° C. with xylene as the circulating agent and subsequent distillation under reduced pressure to remove the circulating agent, solvent-free products having an acid number of less than 3 mg/g and a dynamic viscosity (diluted with water to 50%, DIN EN ISO 3219, measured at 23° C.) of from 5 to 25 Pa·s, as stated in Table 3, were obtained. After storage at 40° C. for 2 weeks, the viscosity of the solutions remained practically unchanged.

TABLE 3

Preparation of the emulsifier resins
(masses employed in g, designation of the reactants employed)

|  |  | Emulsifier resin | | | |
| --- | --- | --- | --- | --- | --- |
|  |  | B1 | B2 | B3 | B4 |
| Alkyd resin |  | 40.9 (A1) | 40.9 (A2) | 40.9 (A3) | 40.2 (A3) |
| Adduct |  | 64.4 (Bb1) | 64.4 (Bb1) | 64.4 (Bb1) | 55.8 (Bb2) |
| Yield | in g | 100 | 100 | 100 | 100 |
| Acid number | in mg/g | 1.5 | 2.3 | 1.8 | 1.0 |
| Dyn. Viscosity | in mPa · s | 9,500 | 15,000 | 25,000 | 5,000 |

Example 3

Comparison Example: Emulsifier Resin Based on Phthalic Anhydride 56 kg of tall oil fatty acid, 41 kg of pentaerythritol, 64 kg of phthalic anhydride and 0.2 kg of dibutyltin dilaurate as a catalyst were heated to 180° C. and 330 kg methoxypolyethylene glycol having a weight-average molar mass of 2,000 g/mol were added and the mixture was heated further to 230° C. After azeotropic distillation at 230° C. with xylene as the circulating agent and subsequent distillation under reduced pressure to remove the circulating agent, 500 kg of a solvent-free product having an acid number of 3 mg/g and a dynamic viscosity (diluted with water to 50%, 23° C.) of 3,600 mPa·s were obtained. After storage at 40° C. for 2 weeks, the viscosity of the solution had fallen to 820 mPa·s and the acid number had risen to 6.6 mg/g. The fresh solution was indeed suitable as an emulsifying resin component for the alkyd resins A1, A2 and A3, but a considerably lower storage stability of the alkyd resin emulsions prepared therefrom was achieved. Thus, an increase in the acid number and settling of the emulsion were already observed during storage of 1 week at room temperature.

Example 4

The preparation according to the invention of the emulsions was carried out in the ratios of amounts stated in Table 4. Component B from Example 2 was charged into a conventional synthetic resin reactor with an anchor stirrer and component A, preheated to 80° C., was added in the course of 2 hours, with stirring.

After further homogenisation for one hour, the mixture was diluted to the desired solids content by slow addition of water and cooled to 30° C.

TABLE 4

Preparation of the alkyd resin emulsions
(masses employed in g, description of the resins used)

|  |  | Alkyd resin emulsion | | | |
| --- | --- | --- | --- | --- | --- |
|  |  | 4-1 | 4-2 | 4-3 | 4-4 |
| Alkyd resin A |  | 89 (A1) | 89 (A2) | 88 (A3) | 88 (A3) |
| Emulsifier resin B |  | 11 B1 | 11 B2 | 12 B3 | 12 B4 |
| Deionised water |  | 66.7 | 66.7 | 66.7 | 66.7 |
| Dynamic viscosity | in mPa · s | 800 | 1,100 | 180 | 80 |
| Mass fraction of solids | in % | 60 | 60 | 60 | 60 |
| use |  | topcoat | topcoat | masonry paint | masonry paint |

A possible adjustment of the pH to approx. 7 was carried out by addition of small amounts of a 5% strength lithium hydroxide solution.

Table 4 also contains information on the use of the emulsions. These are familiar to the person skilled in the art and depend on the recommendations of the resin manufacturer.

Thus, cobalt-zirconium combination drying agents (6% Co and 9% Zr metal content) were added to the oxidatively drying systems and the drying and nature of the film were evaluated in comparison with one another.

All the emulsions gave films which corresponded to a solvent-containing system in drying properties and nature of the film. The stability of the emulsions was determined by storage at 40° C. and 50° C. and 3 freezing-thawing cycles. All the emulsions according to the invention were still in order after 240 hours (50° C.) and after 600 hours (40° C.). After 3 freeze-thaw cycles, no significant changes were found in the emulsions.

Example 5

Preparation of Water-dilutable Paints

White paints were prepared from the alkyd resin emulsions of Examples 4-1 to 4-4 in the following manner using suitable pigment pastes in the following formulation (data for 100 g of paint):

| | |
|---|---|
| 53.0 g | of an alkyd resin emulsion (Example 4-1 to 4-4, 60% strength) |
| 0.50 g | of a siccative combination (6% Co, 9% zirconium, dissolved in white spirit) |
| 0.20 g | of a flow/anti-cratering additive (acrylic polymer) |
| 0.20 g | of a defoamer (based on mineral oil) |
| 0.80 g | of a rheology additive (polyurethane thickener) |
| 36.4 g | of a pigment paste (see below) |
| 8.90 g | of deionised water |

The binder was initially introduced into the mixing vessel, the pigment paste and the additives were then stirred in slowly and in portions, and finally the mixture was adjusted to the desired viscosity with water.

Pigment paste (composition of 100 g of the pigment paste):

| | |
|---|---|
| 17.4 g | of deionised water |
| 3.6 g | of a dispersing agent (nonionic polymer) |
| 1.7 g | of propylene glycol |
| 0.8 g | of a flow and wetting agent (acrylic polymer) |
| 1.9 g | of a defoamer (wax emulsion) |
| 69.3 g | of titanium dioxide (rutile type, 94% $TiO_2$, density 4.0 g/cm$^3$) |
| 5.3 g | of a rheology additive (polyurethane thickener) |

The constituents were stirred into the vessel in the stated sequence and then dispersed in a bead mill for approx. thirty minutes.

The paints had a mass fraction of solids of approx. 57%, and had a viscosity according to ASTM D 4287-88 at a shear rate of 10,000 s$^{-1}$ and 23° C. of approx. 200 mPa·s, and the viscosity according to ASTM D 562 at 23° C. in "Krebs units" was approx. 88 KU. The ratio of the masses of pigment and binder was approx. 0.8:1 and the pH according to DIN 53785 at 23° C., 10% strength aqueous dilution was approx. 7.0.

The tack-free time, measured on a coating with a 152 μm applicator gap, at room temperature (20° C.) was approx. 3 hours.

The paints were applied to primed metal sheets, and after drying in air for approx. 24 hours at room temperature, were evaluated inter alia for gloss and haze. The paints formulated with the alkyd resin emulsions prepared according to the invention show a very good gloss; at a measurement angle of 20°, gloss values greater than 90% were achieved. After storage of the coated metal sheets for 1 month at room temperature, an average decrease in gloss of less than 5% was found. On storage of coated metal sheets in the dark, in comparison with corresponding solvent-borne alkyd resins, no significant yellowing in the dark occurred during a storage time of 3 , months, while paints based on acidic alkyd resins neutralised with amine showed a significantly higher yellowing in the dark.

In addition to white paints, coloured paints and clearcoats were also prepared according to a formulation similar to the recipe stated or in combination with acrylic resin dispersions. These were distinguished by good flow and a high fullness of the paint.

The invention claimed is:

1. Alkyd resin emulsions for topcoats comprising a water-insoluble alkyd resin A and a water-soluble alkyd resin B, which is used as an emulsifying resin and is an esterification product of an alkyd resin Ba, which has a hydroxyl number of at least 30 mg/g, and is homogeneously miscible with the alkyd resin A to be emulsified at least in a mass ratio range of Ba to A of from 2:98 to 50:50, and an adduct Bb of a $C_1$-$C_4$-alkoxypolyethylene glycol Bba and a cycloaliphatic dicarboxylic acid anhydride Bbb in a ratio of amounts of substance of Bba to Bbb of from 0.95:1.05 mol/mol to 1.05:0.95 mol/mol.

2. Alkyd resin emulsions according to claim 1, characterised in that they comprise in their solids content a mass fraction of
   70% to 95% of the water-insoluble alkyd resin A and
   5% to 30% of the water-soluble alkyd resin B employed as an emulsifying resin.

3. Alkyd resin emulsions according to claim 1, characterised in that the alkyd resin B is an esterification product of mass fractions of from 25% to 60% of the alkyd resin Ba and 40% to 75% of the adduct Rb.

4. Alkyd resin emulsions according to claim 1, characterised in that the alkyd resin A has an oil content of from 25% to 75% and an acid number of up to 20 mg/g.

5. Alkyd resin emulsions according to claim 1, characterised in that the acid number of the alkyd resin B is not more than 3 mg/g.

6. Process for the preparation of alkyd resin emulsions according to claim 1, characterised in that
   in the first step mass fractions of
      70% to 95% of a $C_1$-$C_4$alkoxypolyethylene glycol Bba having a weight-average molar mass $M_w$ of from 500 g/mol to 4,000 g/mol, and
      5% to 30% of a cycloaliphatic dicarboxylic acid anhydride Bba are mixed in a substance amounts ratio of from 0.95:1.05 mol/mol to 1.05:0.95 mol/mol, and are reacted in the presence of a catalyst, with opening of the acid anhydride, to form an adduct Bb,
   in the second step a mass fraction of from 40% to 75% of the adduct Bb is esterified with a mass fraction of from 25% to 60% of an the alkyd resin Ba which has a hydroxyl number of at least 30 mg/g and is homogeneously miscible with the alkyd resin A to be emulsified at least in a mass ratio range of Ba to A of from 2:98 to 50:50, the sum of the said mass fractions in the reaction mixture giving 100%, to form an alkyd resin B,
   in the third step the alkyd resin B is mixed with water, a mass fraction of the alkyd resin of from 30% to 60% being present in the mixture, and the mixture having a dynamic viscosity, measured at 23° C. and a shear gradient of 100 s$^{-1}$, of from 5 Pa·s to 50 Pa·s, and
   in the fourth step an alkyd resin A is mixed with the mixture of water and the alkyd resin B from the third step at a temperature of below 100° C. and the resulting alkyd resin emulsion is diluted to a solids mass fraction of from 40% to 75% and a dynamic viscosity of from 200 mPa·s to 3,000 mPa·s by addition of water.

7. Process according to claim 6, characterised in that in the second step the amount of the reactants is chosen such that the acid number of the alkyd resin B is not more than 3 mg/g.

8. Process according to claim 6, characterised in that the ratio of the mass of the alkyd resin A to the mass of the alkyd resin B is 70:30 kg/kg to 95:5 kg/kg.

* * * * *